United States Patent Office 2,969,396
Patented Jan. 24, 1961

2,969,396
PRODUCTION OF OMEGA.OMEGA'-DIAMINO-ALKANES

Otto Von Schickh, Ludwigshafen (Rhine), Germany, assignor to Badische Anilin- & Soda-Fabrik Aktiengesellschaft, Ludwigshafen (Rhine), Germany No Drawing. Filed May 2, 1958, Ser. No. 733,248

Claims priority, application Germany May 10, 1957

5 Claims. (Cl. 260—585)

This invention relates to a process for the production of aliphatic omega.omega'-diamines. In particular, the invention relates to a process for the production of omega.omega'-diamino-alkanes from the corresponding lactim ethers by catalytic hydrogenation in the presence of ammonia.

Various methods are known for the production of aliphatic omega.omega'-diamines. They may be obtained, for example, by the reaction of aliphatic omega.omega'-dihalogen-compounds with ammonia or by catalytic hydrogenation of omega.omega'-dicarboxylic acid nitriles. It is furthermore know from U.S. patent specification No. 2,181,140 that hexamethylene diamine is obtained by catalytically hydrogenating epsilon-caprolactam at temperatures of 200° to 400° C. under increased pressure. Subsequent working of this method (for which no statement as to the yields obtainable is made in the patent specification) has shown that the diamine forms only in very small amounts and that besides lactam which remains unchanged, hexamethyleneimine and large amounts of high molecular weight byproducts are obtained.

It is also known that cyclic imines, for example hexamethylene imine, are obtained by the catalytic hydrogenation of cyclic lactim ethers.

I have now found that omega.omega'-diamino-alkanes are obtained in good yields and without the formation of undesirable byproducts by catalytically hydrogenating a lactim ether of the general formula:

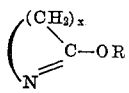

in which—OR represents an alkoxy group with 1 to 4 carbon atoms and X represents any of the series of whole numbers from 3 to 13, in the presence of ammonia.

The initial materials used for the process are the abovementioned lactim ethers, some of which are new, which can readily be obtained by the action of a dialkyl sulfate, such as dimethyl-, diethyl-, dipropyl- or dibutyl sulfate, on a lactam. Instead of the dialkyl-sulfates, the lactams may also be reacted with alkyl halides, as, for example, the corresponding alkyl iodides. In general, the lactim ethers used as initial materials for the process are those which are derived from alkanols with 1 to 4 carbon atoms and which have rings having a ring member number of 5 to 15 atoms. It is preferable to use as lactim ethers the methyl- and ethyl ethers of lactams, such as pyrrolidone, piperidone, caprolactam, oenanthic lactam, caprylic lactam, capric lactam and lauric lactam.

The catalytic hydrogenation in the presence of ammonia is suitably carried out at temperatures of about 15° to 200° C., preferably of 100° to 170° C., and pressures of about 25 to 300 atmospheres, preferably at 65 to 200 atmospheres. Instead of hydrogen there may also be used for the hydrogenation, gases containing hydrogen, the partial pressure of hydrogen corresponding to the said reaction pressures. The ammonia may be added in liquid form, or dissolved in a solvent, or mixed with a diluent. Suitable solvents include water or alcohols, such as methanol, or hydrocarbons, such as cyclohexane. The ammonia, however, may also be forced into the reaction vessel in the gaseous form. The ammonia, in liquid form or dissolved in a solvent, may also be mixed with the lactim ether used as initial material and possibly also with the catalyst prior to introduction into the reaction vessel. At least 1 mol of ammonia is used for each mol of lactim ether added. It is preferable, however, to work with an excess of ammonia which corresponds to about 5 to 25 times the calculated amount, i.e. 5 to 25 mols of ammonia are used for each mol of lactim ether.

It has proved to be advantageous to preheat the said mixture of lactim ether, catalyst and ammonia for some time, for example up to 6 hours, at 80° to 120° C. prior to the forcing of hydrogen into the reaction vessel.

As catalysts there are used known hydrogenation catalysts, as for example the metals of the iron group of the periodic system, such as iron, cobalt, nickel, possibly in the form of Raney catalysts, and also palladium and platinum, preferably in the form of their oxides, and copper. These metals or their suitable compounds may be used as such, for example in finely divided form, or applied to carriers, such as carbon, kieselguhr, pumice, alumina and silica gel. For the process according to the invention there may also be used however the similarly known mixed catalysts such as nickel chromite, copper chromite, nickel-cadmium chromite, nickel-cobalt-cadmium chromite and copper-zinc chromite. To the mixed catalysts there may also be added the first-mentioned hydrogenation catalysts as activating substances. For example, it is advantageous to use as hydrogenation catalysts, Raney nickel and Raney cobalt, reduced cobalt oxide and copper chromite.

The process may be carried out batchwise or continuously.

The following examples will further illustrate this invention but the invention is not restricted to these examples.

Example 1

50 grams of caprolactim methyl ether, 40 grams of liquid ammonia and 5 grams of cobalt obtained by reduction of cobalt oxide are charged into a hydrogenation autoclave of 1 litre capacity. The vessel is closed, 70 atmospheres of hydrogen are forced in and the vessel heated to 110° C. Without forcing in any further hydrogen, the hydrogenation is continued until no further absorption of hydrogen takes place. The vessel is allowed to cool, unreacted ammonia and hydrogen are discharged and the reaction mixture is dissolved in ether. It is freed from catalyst by filtration. The filtrate is distilled, reduced pressure being used after the vaporization of the ether. 34 grams of 1.6-hexamethylene diamine of the melting point 40° C. are obtained. The yield amounts to 74% of the theoretical yield.

By replacing the cobalt catalyst by 5 grams of a copper chromite catalyst (according to Adkins) and working otherwise in the same way under the same conditions, an equally good yield of 1.6-hexamethylene diamine is obtained.

Example 2

50 grams of caprolactim methyl ether, 80 grams of liquid ammonia and 5 grams of cobalt obtained by reduction of cobalt oxide are charged into a 1 litre hydrogenation autoclave. The autoclave is closed and heated for four hours at 95° C. Then 70 atmospheres of hydrogen are forced in and hydrogenation carried out for 8 hours at 150° C. The vessel is then allowed to cool, unreacted ammonia and hydrogen released by decompression, the reaction mixture dissolved in ether and the catalyst filtered off. The filtrate is distilled, the distillation, after the ether has been vaporized off, being carried out under reduced pressure. A yield of 40 grams (equal to 87% of the theoretical yield) of 1.6-hexamethylene diamine of the melting point 40° C. is obtained.

If the caprolactim methyl ether in the present Example 2 is replaced by butyrolactim methyl ether, tetramethylene diamine of the boiling point 157° to 160° C. is obtained in a yield of 73% of the theory.

*Example 3*

39 grams of caprylic lactim methyl ether are heated as in Example 2 with 5 grams of cobalt obtained by reduction of cobalt oxide and 120 grams of ammonia for 4 hours at 110° C. 70 atmospheres of hydrogen are then forced in and hydrogenation carried on for 8 hours at 150° C. After releasing the ammonia and hydrogen by decompression, the residue is dissolved in ether and distilled in vacuo. At 112° to 113° C. at 11 Torr. there distil over 28 grams of octamethylene diamine of the melting point 56° to 57° C., corresponding to 77% of the theoretical yield.

Caprylic lactim methyl ether of the boiling point 86° C. at 19 Torr. is obtained for example by reaction of caprylic lactam with molar amounts of dimethyl sulfate in boiling benzene, by shaking the reaction mixture with carbonate solution and then carrying out fractional distillation.

Lauric lactim ether is obtained analogously by the reaction of lauric lactam with dimethyl sulfate. After the same working up method, lauric lactim ether of the boiling point 94° to 95° C. at 0.6 Torr. is obtained.

If this lauric lactim methyl ether is reacted in the same way as is described in this example with respect to caprylic lactim methyl ether, omega.omega'-dodecamethylene diamine of the boiling point 187° C. at 16 Torr. and the melting point 66° to 67° C. is obtained.

*Example 4*

50 grams of caprolactim methyl ether are heated in an autoclave with 5 grams of a catalyst comprising palladium on animal carbon and 80 grams of liquid ammonia for 4 hours at 110° C., the pressure thereby rising to 65 atmospheres. 70 atmospheres of hydrogen are then forced in and the mixture heated to 150° C. for 8 hours, an end pressure of 175 atmospheres thereby being set up. The vessel is allowed to cool the unreacted ammonia and the hydrogen are released by decompression, the reaction mixture is dissolved in ether and the catalyst filtered off. The filtrate is subjected to fractional distillation, towards the end under reduced pressure. 28 grams of hexamethylene diamine of the boiling point 80° C. to 85° C. at 10 Torr. and melting point 40° C. are obtained.

The same results are obtained by using, instead of the palladium-animal carbon catalyst, a catalyst which contains cobalt applied to silica gel.

What I claim is:

1. A process for the production of omega.omega'-diamino-alkanes which comprises hydrogenating a lactim ether of the formula

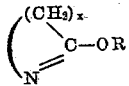

wherein —OR represents an alkoxy group with 1 to 4 carbon atoms and $x$ represents the series of whole numbers from 3 to 13, in the presence of ammonia in an amount of at least one mol per each mol of lactim ether and a hydrogenating catalyst at a temperature of between 15° and 200° C. and a pressure of from 25 to about 300 atmospheres.

2. A process for the production of omega.omega'-diamino-alkanes which comprises heating a lactim ether of the formula

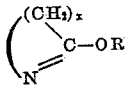

wherein —OR represents an alkoxy group with 1 to 4 carbon atoms and $x$ represents the series of whole numbers from 3 to 13, in admixture with a hydrogenating catalyst and ammonia in an amount of 5 to 25 mols of ammonia per each mol of lactim ether at a temperature of about 80° to about 120° C. and hydrogenating the said mixture at a temperature of between about 100° C. and about 170° C. with hydrogen at a pressure of from about 65 to about 200 atmospheres.

3. A process for the production of 1.6-hexamethylene diamine which comprises hydrogenating caprolactim methyl ether in the presence of 5 to 25 mols ammonia per each mol of caprolactim methyl ether and a hydrogenating catalyst at a temperature of between 15° and 200° C. and a pressure of from about 25 to about 300 atmospheres.

4. A process for the production of 1.8-octamethylene diamine which comprises hydrogenating caprylic lactim methyl ether in the presence of 5 to 25 mols ammonia per each mol of caprylic lactim methyl ether and a hydrogenating catalyst at a temperature of between 15° and 200° C. and a pressure of from about 25 to about 300 atmospheres.

5. A process for the production of omega.omega'-dodecamethylene diamine which comprises hydrogenating lauric lactim methyl ether in the presence of 5 to 25 mols ammonia per each mol of lauric lactim methyl ether and a hydrogenating catalyst at a temperature of between 15° and 200° C. and a pressure of from about 25 to about 300 atmospheres.

References Cited in the file of this patent

UNITED STATES PATENTS 2,181,140    Lazier et al. _____ Nov. 28, 1939